United States Patent
Fujino

(10) Patent No.: US 7,894,091 B2
(45) Date of Patent: Feb. 22, 2011

(54) COMMUNICATION APPARATUS AND CONTROL METHOD

(75) Inventor: Toru Fujino, Kawaguchi (JP)

(73) Assignee: Canon Kabushiki Kaisha, Tokyo (JP)

( * ) Notice: Subject to any disclaimer, the term of this patent is extended or adjusted under 35 U.S.C. 154(b) by 827 days.

(21) Appl. No.: 11/856,507

(22) Filed: Sep. 17, 2007

(65) Prior Publication Data

US 2008/0174826 A1  Jul. 24, 2008

(30) Foreign Application Priority Data

Sep. 25, 2006  (JP)  ............................. 2006-259500
Sep. 4, 2007  (JP)  ............................. 2007-229458

(51) Int. Cl.
G06F 3/12 (2006.01)
G06F 11/00 (2006.01)

(52) U.S. Cl. ..................... 358/1.15; 358/1.13; 358/1.14; 358/400; 358/442; 370/216; 370/230; 370/235; 714/746; 714/748; 714/774; 714/785

(58) Field of Classification Search ........................ None
See application file for complete search history.

(56) References Cited

U.S. PATENT DOCUMENTS 6,295,647 B1 * 9/2001 Ramaswamy ............... 725/116
7,548,332 B2 * 6/2009 Kajiwara ................... 358/1.15
2005/0111371 A1 * 5/2005 Miura et al. ................ 370/242

FOREIGN PATENT DOCUMENTS

JP  2001-292267 A  10/2001

* cited by examiner

*Primary Examiner*—Mark K Zimmerman
*Assistant Examiner*—Miya J Cato
(74) *Attorney, Agent, or Firm*—Canon U.S.A., Inc. I.P. Division

(57) ABSTRACT

An apparatus is capable of executing a facsimile communication using an Error Correction Mode (ECM) function based on a facsimile procedure with a communication partner connected via an Internet Protocol (IP) network. In response to receiving, from the communication partner via the network, a communication start request including information indicating a transport protocol for use in the communication, if the apparatus determines that the transport protocol for use in the communication does not have the error correction function, the apparatus sends to the communication partner a notification indicating that the apparatus is capable of executing the communication using the ECM function. Otherwise, if the apparatus determines that the transport protocol for use in the communication has the error correction function, the apparatus sends to the communication partner a notification indicating that the apparatus is incapable of executing the communication using the ECM function.

11 Claims, 5 Drawing Sheets

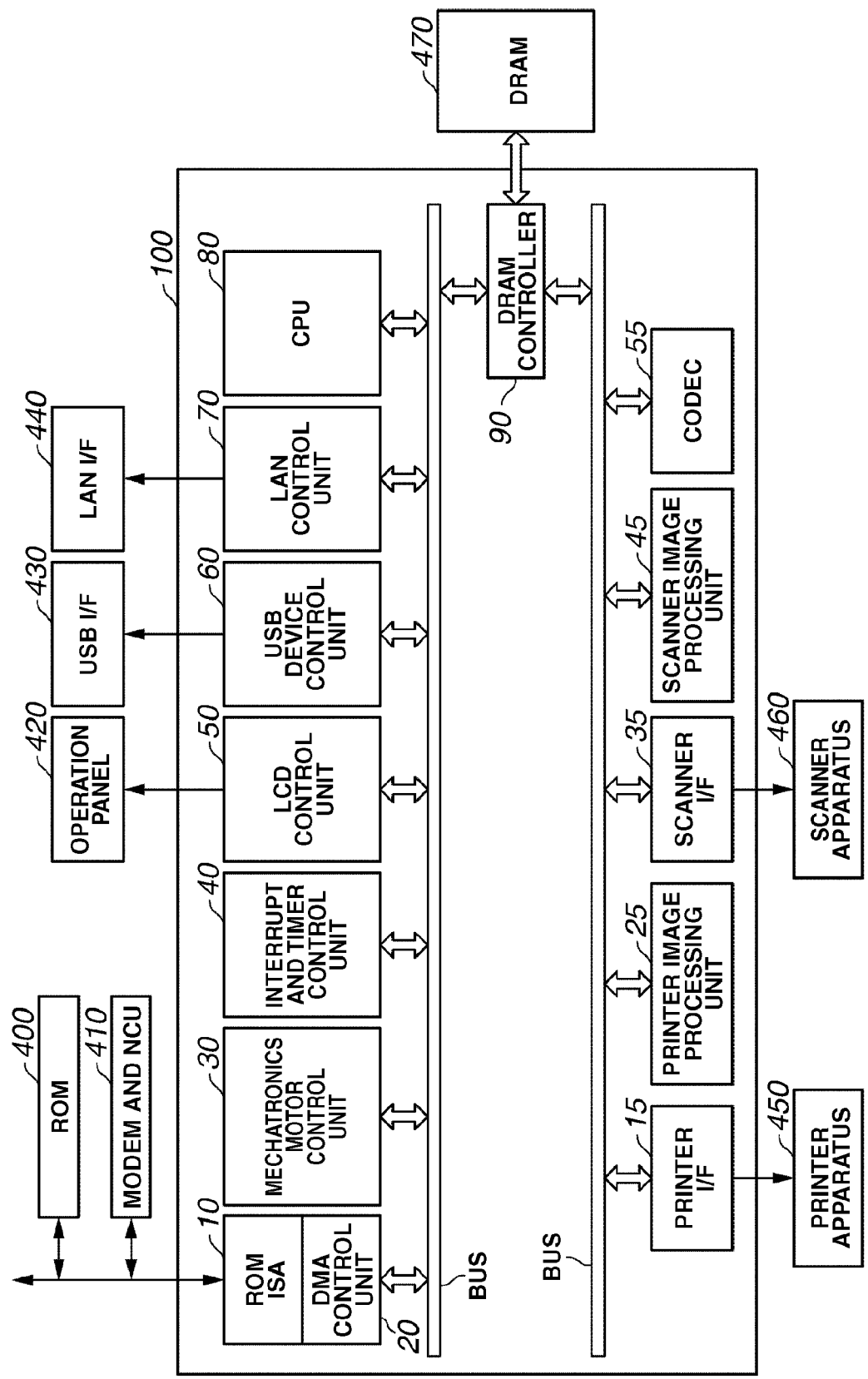

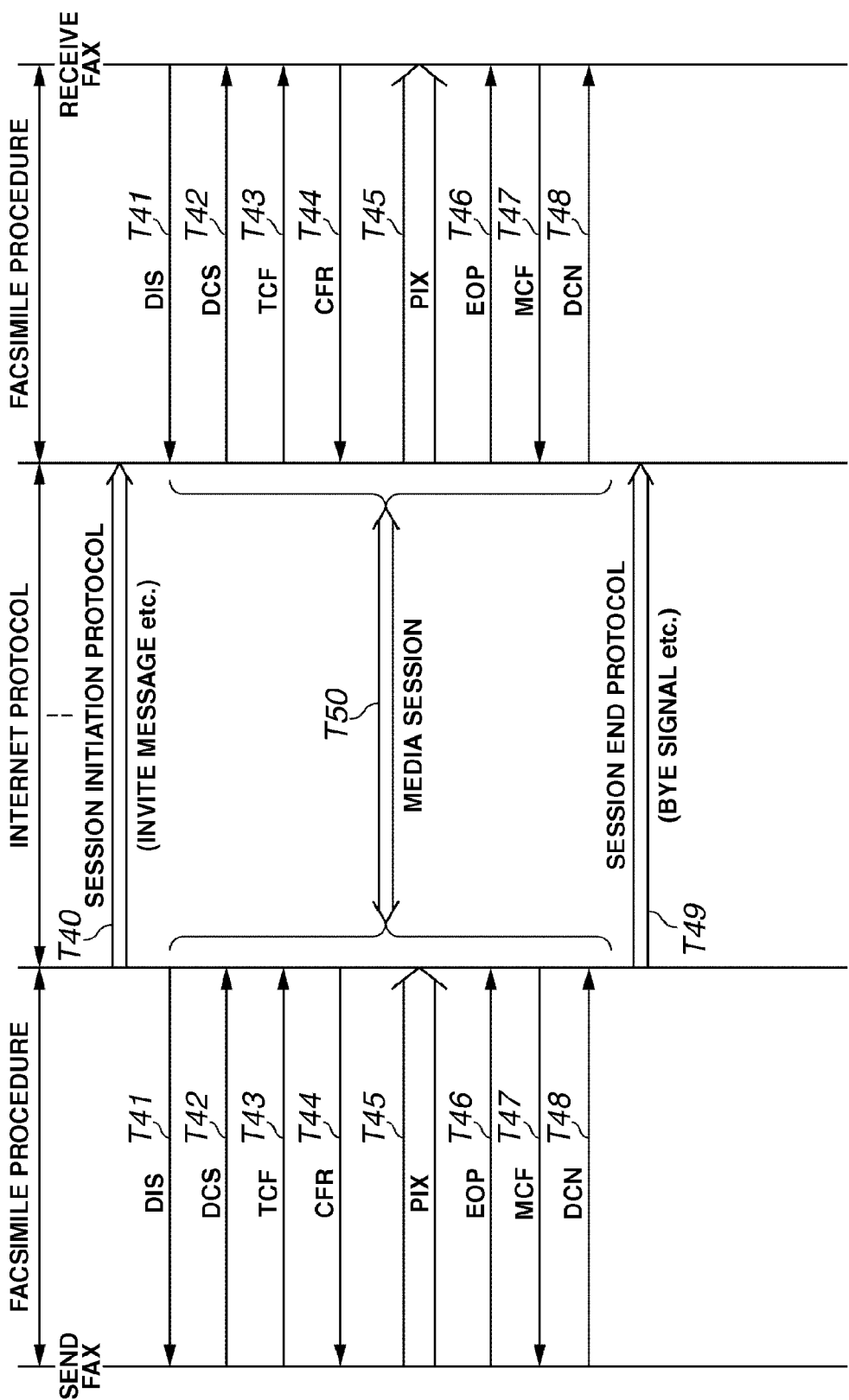

COMMUNICATION APPARATUS AND CONTROL METHOD

BACKGROUND OF THE INVENTION

1. Field of the Invention

The present invention relates to a communication apparatus configured to execute a facsimile communication via an Internet Protocol (IP) network, and a control method thereof.

2. Description of the Related Art

Recently, a broadband line, such as Asymmetric Digital Subscriber Line (ADSL) or Fiber to the Home (FFTH), has remarkably become widespread. To make the best use of a high-speed transmission property of the broadband line, an Internet Protocol (IP) telephone service for transmitting a speech signal with IP packets has increased rapidly.

According to the IP telephone service, speech data is transmitted and received between terminals having IP addresses with Transmission Control Protocol/Internet Protocol (TCP/IP) or User Datagram Protocol/Internet Protocol (UDP/IP) layer. Protocols include Voice over IP (VoIP), such as ITU-T Recommendation H.323. Accordingly, a conversion process from a telephone number to an IP address is required. Currently, the conversion from the telephone number to the IP address is typically performed with a Session Initiation Protocol (SIP) proxy server (RFC2543).

As for the IP telephone communication using SIP, when a telephone number is input at a caller terminal, a session request message that includes a transmission destination telephone number is transmitted to the SIP proxy server. The SIP proxy server, which has received the session request message, obtains an IP address of a callee terminal by performing a necessary process, such as searching a Domain Name System (DNS) server (RFC1035). Accordingly, the SIP proxy server stands proxy for an initial connection process between the caller terminal and the callee terminal. A response message to the session request message is transmitted from the caller terminal. However, these messages are both text streams expressed with text (i.e., character code).

The main part of the SIP message is written in a format which is similar to, for example, a header description format of e-mail, such as "property: value". Then, a process function (i.e., communication function) related to own device's media stream can be written in a format compliant with Session Description Protocol (SDP) (RFC2327) to identify mutual functions of the terminals. Listed below is an example of SDP declaration (proposal) of the caller terminal described in Appendix of RFC2543 "B. 1 Configuring Media Streams".

v=0
o=alice 2890844526 2890844526 IN IP4 host.anywhere.com
c=IN IP4 host.anywhere.com
m=audio 49170 RTP/AVP 0
a=rtpmap: 0 PCMU/8000
m=video 51372 RTP/AVP 31
a=rtpmap: 31 H261/90000
m=video 53000 RTP/AVP 32
a=rtpmap: 32 MPV/90000

As described above, SDP includes "=" positioned after one character mnemonic (v, o, c, m . . . ), followed by text-expressed values separated by slashes and spaces. Particularly, mnemonic "m" can express types of media stream to be processed by a terminal, such as audio and video. Also, mnemonic "v" is used to identify a protocol version, mnemonic "o" is used to identify an initiator or owner of the session (or message), and mnemonic "c" is used to describe various connection information.

On the other hand, facsimile apparatuses, which can easily transmit and receive image data, have been used before the IP network, such as the Internet, became popular. Transmission of image data to a destination with a facsimile apparatus is extremely simple just by specifying a telephone number. Yet, facsimile apparatuses are widely used even today where images can be transmitted from personal computers (PCs) or cellular phone terminals via e-mail.

Currently, as a procedure to utilize a facsimile procedure for communication over the IP network, a so-called real-time Internet facsimile procedure, described in ITU-T Recommendation T.38, is known. ITU-T Recommendation T.38 defines a procedure which is defined by ITU-T Recommendation T.30 as it is over the IP network, on the premise that the facsimile communication protocol is to be used on a public switched telephone network (PSTN).

As a procedure to avoid data error occurrence determined in ITU-T Recommendation T.30, there is known a communication using Error Correction Mode (ECM). The ECM is defined on the premise that a data error occurs in a communication network, and is valid on the public switched telephone network. However, in the case where an Internet facsimile using the IP network is selected, especially where TCP/IP having an error correction function is selected, the data error is checked for redundantly twice. Thus, a problem arises in that the data transmission efficiency may be lowered as a result of checking for data error multiple times.

In regard to such a problem, one can consider a facsimile communication method for omitting the ECM procedure and defining its own communication mode.

For example, as discussed in Japanese Patent Application Laid-Open No. 2001-292267, in a non-standard procedure communication for performing data communication at the same channel as a call control channel, a capability negotiation is performed with a destination device using a call control message via the call control channel. In this capability negotiation, a sending device notifies the destination device that the sending device supports data transfer omitting the ECM procedure.

However, in the case of the communication discussed in Japanese Patent Application Laid-Open No. 2001-292267, notification/non-notification of the ECM procedure is performed in the non-standard procedure communication. Accordingly, it lacks in communication versatility for different manufacturers' apparatuses.

SUMMARY OF THE INVENTION

An embodiment of the present invention is directed to a communication apparatus and a control method capable of efficiently performing communication while omitting an ECM procedure when a transport protocol having an error correction function is used in a standard procedure so as not to lose communication versatility between different manufactures' apparatuses.

According to an aspect of the present invention, a communication apparatus configured to execute a facsimile communication using a Error Correction Mode (ECM) function based on a facsimile procedure with a communication partner connected via an Internet Protocol (IP) network includes a receiving unit configured to receive, from the communication partner via the IP network, a communication start request including protocol information that indicates a transport protocol for use in the communication; a notifying unit configured to, when the receiving unit receives the communication start request, send to the communication partner a notification in conformance with a standard facsimile procedure, the notification indicating a capability of the communication apparatus; and a determining unit configured to, based on the protocol information, determine whether the transport protocol for use in the communication is a transport protocol which has an error correction function, wherein, if the determining unit determines that the transport protocol for use in the communication is not the transport protocol which has the error correction function, the notifying unit sends the notification indicating that the communication apparatus is capable of executing the communication using the ECM function to the communication partner, and if the determining unit determines that the transport protocol for use in the communication is the transport protocol which has the error correction function, the notifying unit sends the notification indicating that the communication apparatus is not capable of executing the communication using the ECM function to the communication partner regardless of the communication apparatus having the ECM function.

According to another aspect of the present invention, a communication apparatus configured to execute a facsimile communication using an Error Correction Mode (ECM) function based on a facsimile procedure with a communication partner connected via an Internet Protocol (IP) network includes a transmitting unit configured to transmit, to the communication partner via the IP network, a communication start request for requesting starting the communication; a receiving unit configured to receive a response to the communication start request from the communication partner, a response including information that indicates whether the communication partner is capable of executing the communication using the ECM function; a notifying unit configured to, when the receiving unit receives the response, send to the communication partner a notification in conformance with a standard facsimile procedure, the notification indicating whether the communication apparatus executes the communication using the ECM function with the communication partner; and a determining unit configured to determine whether a transport protocol for use in the communication is a transport protocol which has an error correction function, wherein, if the determining unit determines that the transport protocol for use in the communication is not the transport protocol which has the error correction function, the notifying unit sends the notification to the communication partner based on whether the communication partner is capable of executing the communication using the ECM function, and if the determining unit determines that the transport protocol for use in the communication is the transport protocol which has the error correction function, the notifying unit sends the notification indicating that the communication apparatus executes the communication without using the ECM function with the communication partner to the communication partner regardless of the communication partner being capable of executing the communication using the ECM function.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 1A illustrates a block diagram illustrating an example of a configuration of an image communication apparatus according to an exemplary embodiment of the present invention.

FIG. 4 illustrates a communication procedure between Internet facsimile apparatuses according to an exemplary embodiment of the present invention.

DETAILED DESCRIPTION OF THE EMBODIMENTS

Figure 1B:
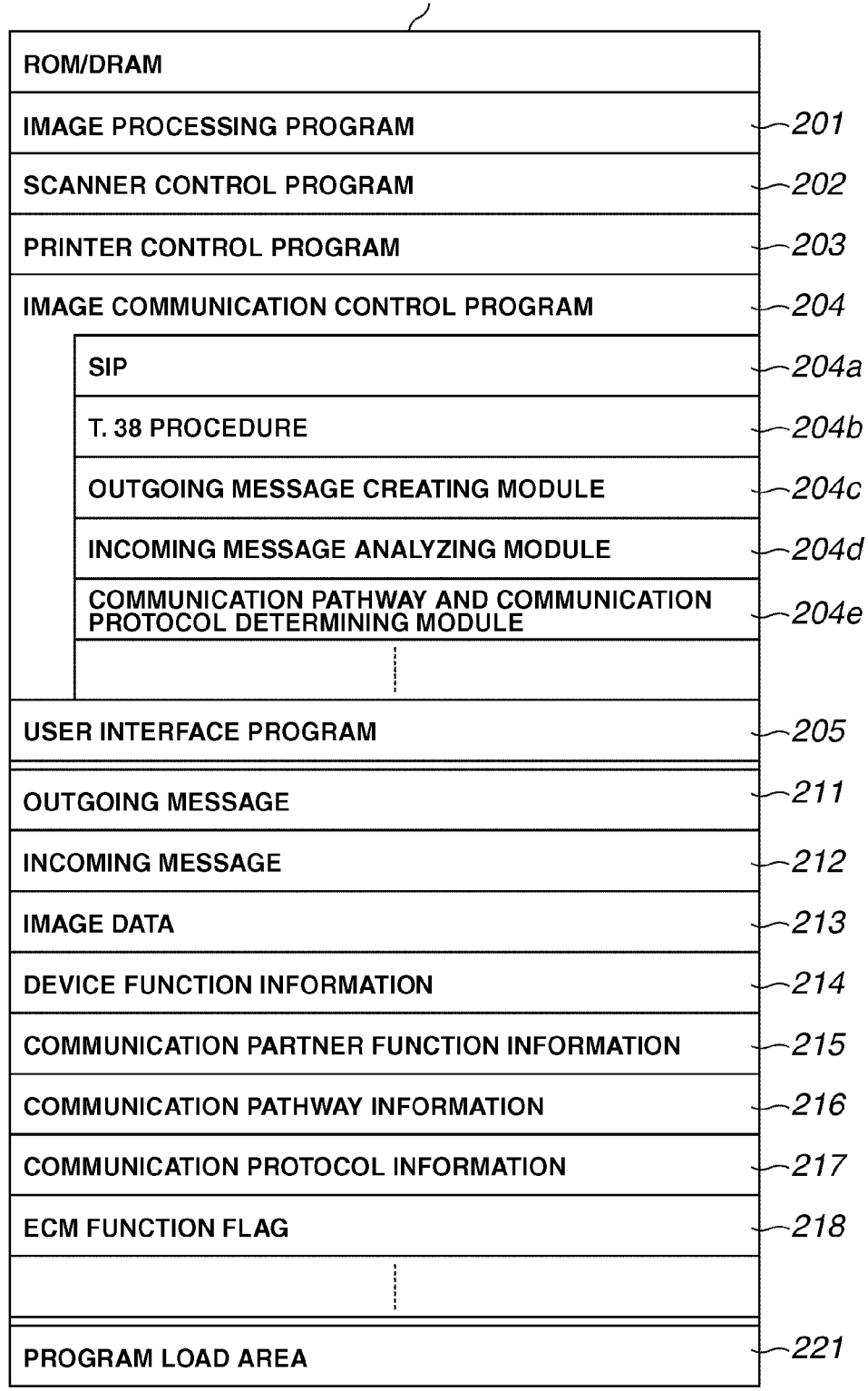
FIG. 1B illustrates an example of a storage configuration of a read-only memory (ROM) or dynamic random access memory (DRAM) illustrated in FIG. 1A.

Various exemplary embodiments, features, and aspects of the invention will be described in detail below with reference to the drawings.

Hereinbelow, exemplary embodiments relate to an image communication apparatus that performs image communication via the IP network, especially a multifunction peripheral having a scanner function, a printer function, a facsimile function, and an Internet communication function.

FIG. 1A illustrates a block diagram of an exemplary configuration of an image communication apparatus according to an exemplary embodiment of the present invention. The image communication apparatus includes a system control chip 100.

The system control chip 100 includes a block ROM ISA 10, a direct memory access (DMA) control unit 20, a mechatronics motor control unit 30, an interrupt and timer control unit 40, a liquid crystal device (LCD) control unit 50, a universal serial bus (USB) device control unit 60, and a local area network (LAN) control unit 70. The block ROM ISA 10 controls an external ISA bus, which is used to connect a ROM 400 for storing programs and a facsimile communication modem and network control unit (NCU) 410. The DMAC 20 controls direct memory access (DMA). The mechatronics motor control unit 30 controls a motor of a scanner unit, which is used to convey original documents. The interrupt and timer control unit 40 performs interruption and controls a timer. The LCD control unit 50 controls an operation panel 420. The USB device control unit 60 controls a USB I/F 430, which is used to connect to a computer. The LAN control unit 70 controls a LAN interface (I/F) 440.

The system control chip 100 further includes a central processing unit (CPU) 80, a DRAM controller 90, a printer I/F 15, a printer image processing unit 25, a scanner I/F 35, a scanner image processing unit 45, and a codec 55. The CPU 80 executes a program for controlling the image communication apparatus, including a communication operation. The DRAM controller 90 controls, for example, a DRAM 470, which is an external memory. The printer I/F 15 controls a printer apparatus 450. The printer image processing unit 25 performs an image printing process. The scanner I/F 35 controls a scanner apparatus 460, which scans an original document. The scanner image processing unit 45 processes the scanned image. The codec 55 encodes and decodes image data.

A typical Internet facsimile communication operation of the image communication apparatus with the above-described configuration according to the present exemplary embodiment will be described below.

A user, performing a real-time Internet facsimile communication, sets an original document to the scanner apparatus 460 and operates the operation panel 420 to select a communication pathway or a resolution, to set a transmission destination, and to instruct starting a job. The scanner I/F 35 scans and reads the original document as image data with the mechatronics motor control unit 30 and the scanner apparatus 460. Next, the scanner image processing unit 45 performs necessary processing, such as shading correction, on the image data. The codec 55 compresses the processed image data. The DRAM controller 90 stores the compressed image data in the DRAM 470.

On the other hand, the LAN control unit 70 performs a connection procedure to the IP network via the LAN I/F 440. Operation compliant with ITU-T Recommendation T.38 starts upon completion of the connection procedure with a receiving-side apparatus. After that, according to a facsimile communication program executed by the CPU 80, the image data stored in the DRAM 470 is decoded by the codec 55 into code corresponding to an ability of the receiving-side apparatus. Then, the coded image data is transmitted to the receiving-side apparatus.

At the receiving-side apparatus, according to the facsimile communication program, image data received by the LAN control unit 70 via the LAN I/F 440 is decoded and encoded by the codec 55. Then, the image data is stored in the DRAM 470. After that, the image data stored in the DRAM 470 is printed and output with the printer 450 via the printer image processing unit 25 and the printer I/F 15.

FIG. 1B illustrates a configuration example of storage content of memory including the ROM 400 or the DRAM 470 illustrated in FIG. 1A. Further, FIG. 1B illustrates programs and data related to the present exemplary embodiment, and unrelated and typical data is not illustrated.

An image processing program 201 controls the image communication apparatus according to the present exemplary embodiment. A scanner control program 202 controls the scanner apparatus 460. A printer control program 203 controls the printer apparatus 450.

An image communication control program 204 includes a standard protocol for controlling image communication. The image communication control program 204 includes a Session Initiation Protocol (SIP) 204a, a T.38 procedure 204b, an outgoing message creating module 204c, an incoming message analyzing module 204d, a communication pathway and communication protocol determining module 204e, etc.

A user interface program 205 is used as an interface with a user via the operation panel 420.

A storage area 211 stores an outgoing message created by the outgoing message creating module 204c. A storage area 212 stores an incoming message analyzed by the incoming message analyzing module 204d. A storage area 213 stores image data. The image data can be description language information, intermediate data, bitmap, or compressed data.

A storage area 214 stores own device's function information. A storage area 215 stores destination device's function information. A storage area 216 stores communication pathway information determined by the communication pathway and communication protocol determining module 204e. A storage area 217 stores communication protocol information. A flag 218 indicates presence or absence of the ECM function.

A program load area 221 is used to load programs to be executed by the CPU 80 when the programs are stored on an external memory, such as a disk.

FIG. 4 illustrates an exemplary communication procedure of the real-time Internet facsimile according to the present exemplary embodiment.

An SIP message is transmitted from a transmitting-side apparatus to a receiving-side apparatus with an SIP T40, which is a standard session control protocol for the Internet. The SIP message includes an INVITE message for requesting starting communication to the destination device (communication partner) Further, the INVITE message includes an SDP media stream description including information that indicates a transport protocol to be used in the communication.

Signals T41 to T48 are examples of signals in the standard facsimile procedure defined by ITU-T Recommendation T.38 after shifting to the media session T50. A digital identification (DIS) signal T41 includes information indicating a receiving capability. A digital command (DCS) signal T42 indicates a communication capability. A training check frame (TCF) signal T43 is used for training check. A confirmation to receive (CFR) signal T44 indicates end of receiving preparation. T45 represents an image signal (PIX). An end of procedure (EOP) signal T46 indicates end of transmission of the image signal. A message confirmation (MCF) signal T47 is a reception end signal that responds to the EOP signal. A disconnect (DCN) signal T48 indicates line disconnection. T50 represents an Internet facsimile communication, which performs information exchange via the Internet according to the standard facsimile procedure defined by ITU-T Recommendation T.38 during the media session.

A session end protocol T49 includes a BYE signal sent from a transmitting-side apparatus to a receiving-side apparatus and an OK signal responsive thereto.

Figure 2:
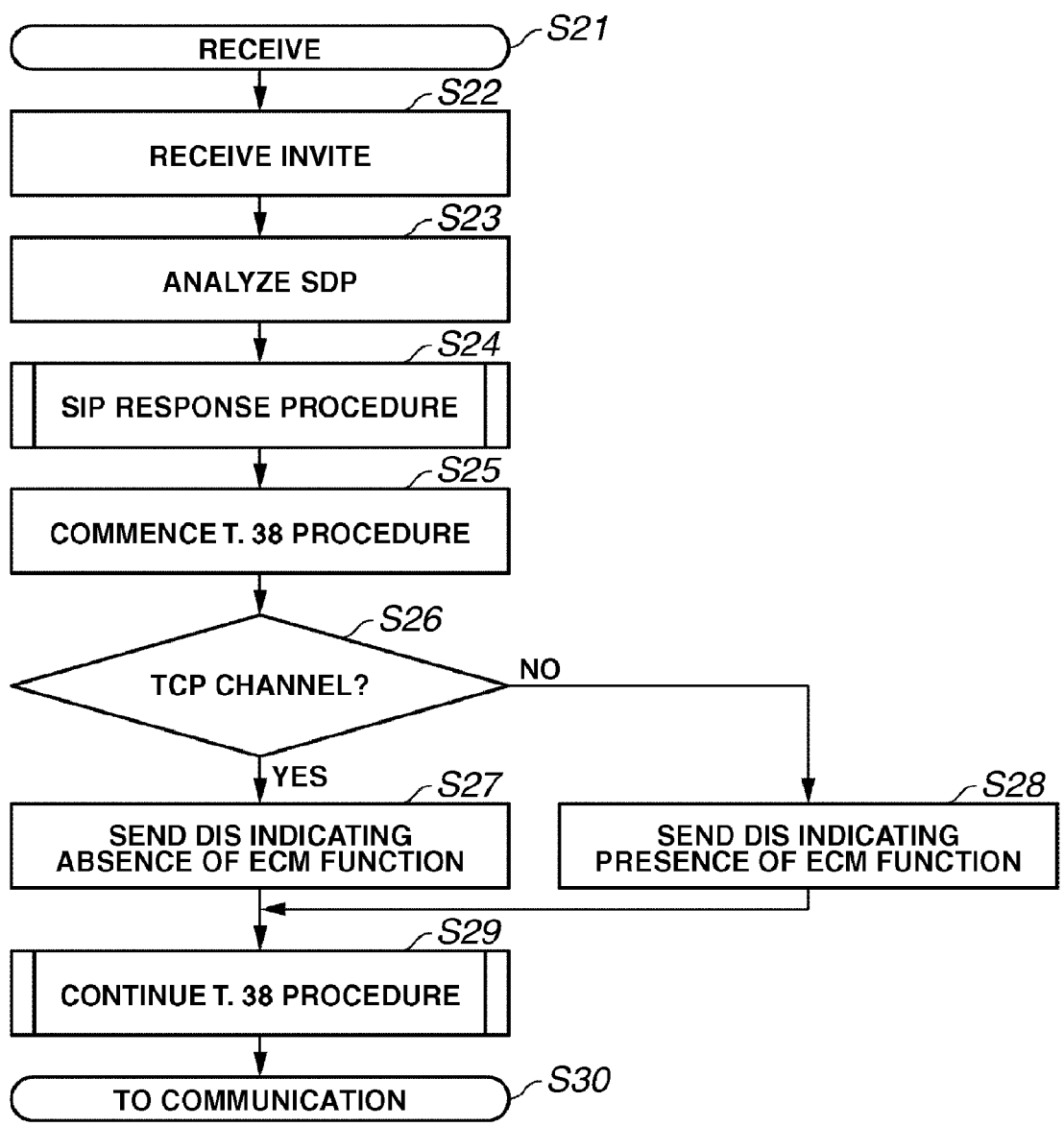
FIG. 2 is a flowchart illustrating a process procedure of a receiving-side image communication apparatus according to an exemplary embodiment of the present invention.

Method for selecting a DIS signal in the T.38 procedure of the receiving-side apparatus according to a program executed by the CPU 80 will be described below with reference to FIG. 2.

When a call arrives from the IP network via SIP in step S21, the CPU 80 receives an INVITE message in step S22. In step S23, the CPU 80 analyzes a Session Description Protocol (SDP) included in the INVITE message, determines whether a transport protocol used in the communication has arrived via a Transmission Control Protocol (TCP) or via a User Datagram Protocol (UDP), and stores a result of determination.

Then, the CPU 80 sends a response according to a standard protocol of SIP in step S24, and starts an Internet facsimile procedure according to the T.38 procedure in step S25. In step S26, the CPU 80 determines whether the determination result of the transport protocol stored in step S23 is TCP. If it is determined that the transport protocol is TCP (YES in step S26), although the receiving-side apparatus has the ECM function, the CPU 80 sends a DIS signal indicating the absence of the ECM function in step S27. If it is determined that the transport protocol is UDP (NO in step S26), the CPU 80 sends a DIS signal indicating the presence of the ECM function in step S28, as in a conventional facsimile apparatus.

After that, the CPU 80 continues the real-time Internet facsimile procedure according to the T.38 procedure in steps S29 and S30.

Figure 3:
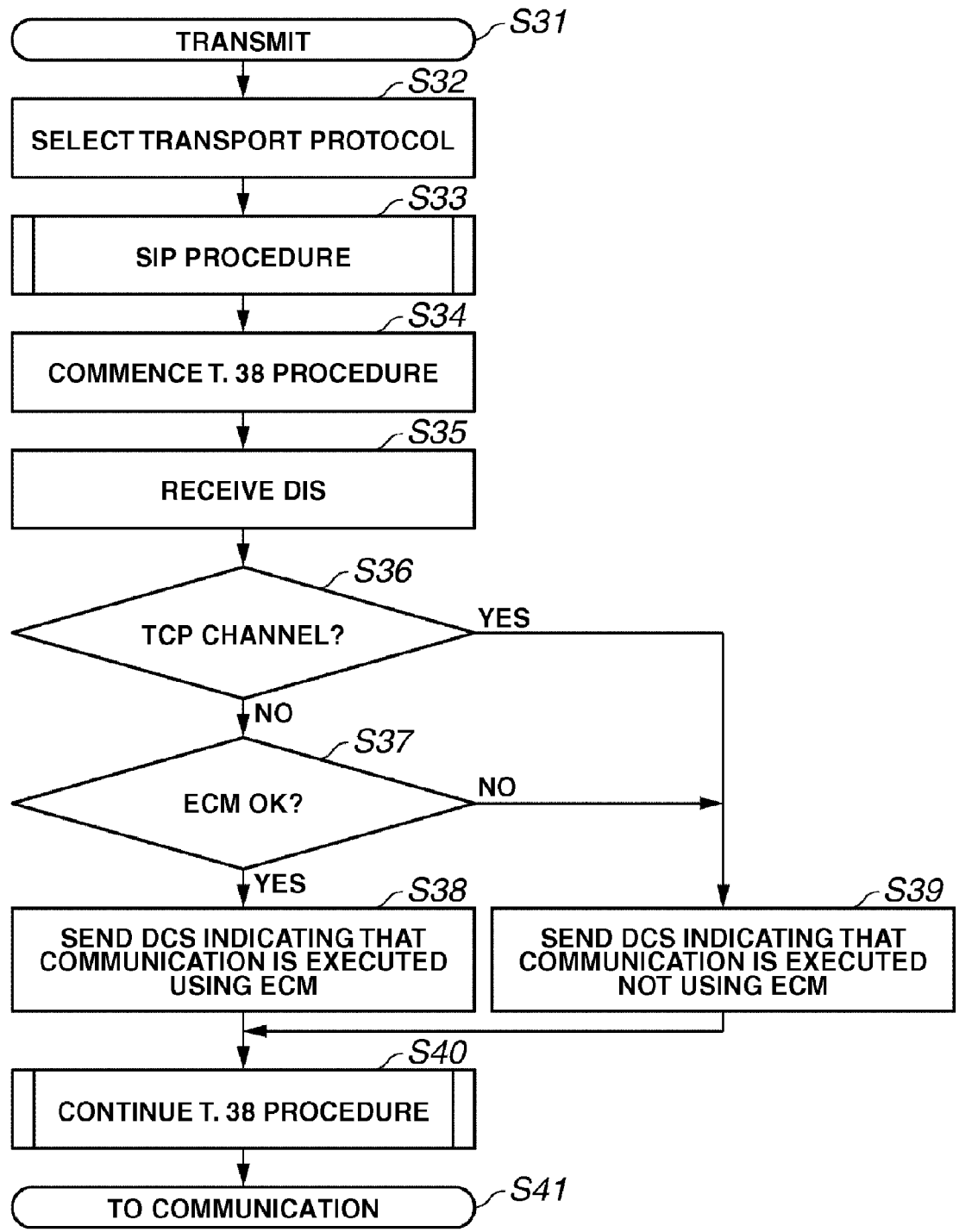
FIG. 3 is a flowchart illustrating a process procedure of a transmission-side image communication apparatus according to an exemplary embodiment of the present invention.

Method for selecting a DCS signal in the T.38 procedure of the transmitting-side apparatus according to a program executed by the CPU 80 will be described with reference to FIG. 3.

A call for transmission is originated in step S31. In step S32, the CPU 80 selects a transport protocol used in the communication according to a user operation or an apparatus setup. In step S33, the CPU 80 starts a SIP procedure including an INVITE message describing an SDP that indicates the selected transport protocol.

When the SIP procedure with the receiving-side apparatus is completed to establish a call, the CPU 80 starts the T.38 procedure in step S34, and receives a DIS signal from the receiving-side apparatus in step S35. In step S36, the CPU 80 determines whether TCP is selected in step 32. If it is determined that TCP is selected, then in step S39, the CPU 80 sends DCS indicating that the image communication apparatus executes the communication not using the ECM function with the receiving-side apparatus.

If it is determined that UDP is selected, then in step S37, the CPU 80 analyzes the received DIS signal, and determines whether the receiving-side apparatus has the ECM function. If it is determined that the receiving-side apparatus has the ECM function, then in step S38, the CPU 80 sends DCS indicating that the image communication apparatus executes the communication using the ECM function with the receiving-side apparatus. On the other hand, if it is determined that the receiving-side apparatus does not have the ECM function, then in step 39, the CPU 80 sends DCS indicating that the image communication apparatus executes the communication not using the ECM function with the receiving-side apparatus.

Then, the CPU 80 continues the real-time Internet facsimile procedure according to the T.38 procedure in steps S40 and S41.

The present invention can be applied to a communication apparatus which performs audio and image communication via the IP network. In the case of such a communication apparatus, in addition to those configured as a specialized apparatus, an image inputting and outputting unit, such as scanner or camera interface, and a hardware equipment, such as a PC having a network interface, can be used and implemented. Specifically, if a method or a program according to an exemplary embodiment of the present invention uses such a PC hardware, the method or program is introduced to the PC hardware via an appropriate storage medium or via a network.

The present invention can be applied to a system or an integral apparatus that includes a plurality of devices (e.g., a host computer, an interface device, and a printer), and to an apparatus that includes a single device.

The present invention can be implemented by supplying, to a system or an apparatus, a storage medium which stores software program code that implements functions of the above-described exemplary embodiments. In such a case, the functions of the above-described exemplary embodiments are implemented by the program code read from the storage medium, so that the storage medium storing the program code constitutes the present invention. Moreover, the functions of the above-described exemplary embodiments can be implemented by performing all of or part of the actual processing with an operating system (OS) based on the instruction of the program code read by a computer.

The program code read from the storage medium can be written to a memory provided in a function extension card inserted into a computer or a function extension unit connected to a computer. Then, the functions of the above-described exemplary embodiments can be implemented by performing all of or part of the actual processing with a CPU provided in the function extension card or the function extension unit based on the instruction of the program code.

In the case of applying the storage medium to an embodiment of the present invention, the storage medium stores program code corresponding to the above-described flowcharts according to an embodiment of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Applications No. 2006-259500 filed Sep. 25, 2006 and No. 2007-229458 filed Sep. 4, 2007, which are hereby incorporated by reference herein in their entirety.

What is claimed is:

1. A communication apparatus capable of executing facsimile communication with a communication partner connected thereto via an IP network, using an ECM function based on a facsimile procedure, comprising:

receiving means for receiving a communication start request from the communication partner, the communication start request including protocol information that indicates a transport protocol used in the facsimile communication;

notifying means for notifying, when the receiving means receives the communication start request, the communication partner of a capability of the communication apparatus by transmitting a DIS signal complying with a standard facsimile procedure; and determining means for determining, based on the protocol information, whether the transport protocol used in the facsimile communication is a transport protocol having an error correction function, wherein when the determining means determines that the transport protocol used in the facsimile communication is not a transport protocol having an error correction function, the notifying means transmits a DIS signal indicating that the communication apparatus has an ECM function, and when the determining means determines that the transport protocol used in the facsimile communication is a transport protocol having an error correction function, the notifying means transmits a DIS signal indicating that the communication apparatus does not have an ECM function.

2. The communication apparatus according to claim 1, wherein when the protocol information indicates TCP/IP, the determining means determines that the transport protocol used in the facsimile communication is a transport protocol having an error correction function, and when the protocol information indicates UDP/IP, the determining means determines that the transport protocol used in the facsimile communication is not a transport protocol having an error correction function.

3. The communication apparatus according to claim 1, wherein the facsimile communication is facsimile communication according to ITU-T Recommendation T.38.

4. A communication apparatus capable of executing facsimile communication with a communication partner connected thereto via an IP network, using an ECM function based on a facsimile procedure, comprising:

transmitting means for transmitting a communication start request for requesting start of the facsimile communication to the communication partner;

receiving means for receiving a response to the communication start request from the communication partner, the response including information that indicates a capability of the communication partner in compliance with a standard facsimile procedure;

instructing means for instructing the communication partner, when the receiving means receives the response, whether the communication apparatus executes the facsimile communication with the communication partner using an ECM function, by transmitting a DCS signal complying with a standard facsimile procedure; and determining means for determining whether a transport protocol used in the facsimile communication is a transport protocol having an error correction function, wherein when the determining means determines that the transport protocol used in the facsimile communication is not a transport protocol having an error correction function, if it is determined that the communication partner has an ECM function, the instructing means transmits a DCS signal for instructing that the communication apparatus execute the facsimile communication with the communication partner using an ECM function, and if it is determined that the communication partner does not have an ECM function, the instructing means transmits a DCS signal for instructing that the communication apparatus execute the facsimile communication with the communication partner without using an ECM function, and when the determining means determines that the transport protocol used in the facsimile communication is a transport protocol having an error correction function, the instructing means transmits a DCS signal for instructing that the communication apparatus execute the facsimile communication with the communication partner without using an ECM function regardless of whether the communication partner has an ECM function.

5. The communication apparatus according to claim 4, wherein the facsimile communication is facsimile communication according to ITU-T Recommendation T.38.

6. A control method for a communication apparatus capable of executing facsimile communication with a communication partner connected thereto via an IP network, using an ECM function based on a facsimile procedure, comprising:

a receiving step of receiving a communication start request from the communication partner, the communication start request including protocol information that indicates a transport protocol used in the facsimile communication;

a notifying step of notifying, when the communication start request is received in the receiving step, the communication partner of a capability of the communication apparatus by transmitting a DIS signal complying with a standard facsimile procedure; and a determining step of determining, based on the protocol information, whether the transport protocol used in the facsimile communication is a transport protocol having an error correction function, wherein when it is determined in the determining step that the transport protocol used in the facsimile communication is not a transport protocol having an error correction function, a DIS signal indicating that the communication apparatus has an ECM function is transmitted in the notifying step, and when it is determined in the determining step that the transport protocol used in the facsimile communication is a transport protocol having an error correction function, a DIS signal indicating that the communication apparatus does not have an ECM function is transmitted in the notifying step.

7. The control method for a communication apparatus according to claim 6, wherein in the determining step, when the protocol information indicates TCP/IP, it is determined that the transport protocol used in the facsimile communication is a transport protocol having an error correction function, and when the protocol information indicates UDP/IP, it is determined that the transport protocol used in the facsimile communication is not a transport protocol having an error correction function.

8. The control method for a communication apparatus according to claim 6, wherein the facsimile communication is facsimile communication according to ITU-T Recommendation T.38.

9. A non-transitory computer-readable storage medium storage a program for causing a computer to execute the control method for a communication apparatus according to claim 6.

10. A control method for a communication apparatus capable of executing facsimile communication with a communication partner connected thereto via an IP network, using an ECM function based on a facsimile procedure, comprising:

a transmitting step of transmitting a communication start request for requesting start of the facsimile communication to the communication partner;

a receiving step of receiving a response to the communication start request from the communication partner, the response including information that indicates a capability of the communication partner in compliance with a standard facsimile procedure;

an instructing step of instructing the communication partner, when the response is received in the receiving step, whether the communication apparatus executes the facsimile communication with the communication partner using an ECM function, by transmitting a DCS signal complying with a standard facsimile procedure; and a determining step of determining whether a transport protocol used in the facsimile communication is a transport protocol having an error correction function, wherein when it is determined in the determining step that the transport protocol used in the facsimile communication is not a transport protocol having an error correction function, in the instructing step, if it is determined that the communication partner has an ECM function, a DCS signal for instructing that the communication apparatus execute the facsimile communication with the communication partner using an ECM function is transmitted, and if it is determined that the communication partner does not have an ECM function, a DCS signal for instructing that the communication apparatus execute the facsimile communication with the communication partner without using an ECM function is transmitted, and when it is determined in the determining step that the transport protocol used in the facsimile communication is a transport protocol having an error correction function, a DCS signal for sending an instruction that the communication apparatus executes the facsimile communication with the communication partner without using an ECM function regardless of whether the communication partner has an ECM function is transmitted in the instructing step.

11. The control method for a communication apparatus according to claim 10, wherein the facsimile communication is facsimile communication according to ITU-T Recommendation T.38.

* * * * *